United States Patent [19]

Shoji et al.

[11] 3,848,982

[45] Nov. 19, 1974

[54] MICROFILM READER

[75] Inventors: Akira Shoji, Yokohama; Hitoshi Yanagawa, Tokyo; Takashi Hirashima, Kawasaki, all of Japan

[73] Assignee: Canon Kabushiki Kaisha, Tokyo, Japan

[22] Filed: Aug. 31, 1972

[21] Appl. No.: 285,259

[30] Foreign Application Priority Data
Sept. 15, 1971 Japan.......................... 46-84076[U]

[52] U.S. Cl...................................... 353/27, 353/87
[51] Int. Cl.. G03b 23/08, G03b 21/20, G03b 21/11
[58] Field of Search ................... 353/27, 57, 85, 87; 240/37

[56] References Cited
UNITED STATES PATENTS

| | | | |
|---|---|---|---|
| 3,023,668 | 3/1962 | Allen | 353/85 |
| 3,038,062 | 6/1962 | Liberman | 240/37 |
| 3,320,854 | 5/1967 | Wally | 353/27 |
| 3,642,361 | 2/1972 | Streu | 353/57 |
| 3,733,121 | 5/1973 | Smitzer | 353/27 |

FOREIGN PATENTS OR APPLICATIONS
1,955,484  5/1970  Germany ............................ 353/27

*Primary Examiner*—Louis R. Prince
*Assistant Examiner*—A. J. Mirabito
*Attorney, Agent, or Firm*—Fitzpatrick, Cella, Harper & Scinto

[57] ABSTRACT

A microfilm reader for reading micro images recorded on a microfilm comprises a housing, a projection screen disposed in the front face of the housing, optical means for projecting therethrough images on the screen, a light source for illuminating micro images, and film holder disposed between the optical means and the light source for holding a microfilm. The light source includes a main lamp unit having a main lamp for connection with a main power source and an auxiliary lamp unit having an auxiliary lamp for connection with an auxiliary power source. The two units may be selectively and removably mounted in the housing in a drawer-like fashion.

4 Claims, 11 Drawing Figures

PATENTED NOV 19 1974

MICROFILM READER

BACKGROUND OF THE INVENTION

1. Field of the Invention

This invention relates to a microfilm reader, and more particularly to a microfilm reader in which an illuminating light source comprises a lamp unit for connection with a main power source and a lamp unit for connection with an auxiliary power source and the two lamp units may be selectively and removably mounted in the housing of the reader.

2. Description of the Prior Art

It has commonly been in practice that information, especially various kinds of information are recorded in the form of micro images at a high density to economize the space required for the storage of such information and if desired, the recorded micro images are enlarged and projected on a viewing screen or printed to an enlarged scale by a printer.

Two types of microfilm are applicable for the above-described purposes. One of them is a rolled microfilm having information images recorded thereon in juxtaposed relationship and the other is the recently developed microfiche film which comprises a sheet of film having micro images recorded thereon in a form of matrix.

Microfilm has been much in use along with the development of the COM (Computer Output Microfilming) technique which enables the output of an electronic computer to be directly recorded on microfilm. A mirofilm having micro images recorded thereon may be duplicated by a duplicator device and such duplicates may be distributed to numerous users. The users employ microfilm readers to enlarge and project the microfilmed information images on a screen so that they may view the recorded information to utilize the same in their daily business.

Heretofore, commercially available power sources have been used to drive microfilm readers. However, when the commercially available power sources cannot be utilized, such as when failure of the power supply or other accident occurs, the microfilm readers must be left unused until the power supply is restored or until the microfilm readers are ready for connection with independent electric power generators, and this means a waste of time and an inconvenience to business.

Independently of such accidents as the failure of power supply and the like, the conventional microfilm readers cannot be operated within a space having no provision for plug sockets, for example, within bankers' safes or the like. Thus, microfilm readers have been much limited in use and could not enjoy a wider range of use.

SUMMARY OF THE INVENTION

It is a primary object of the present invention to eliminate all the aforesaid disadvantages existing in the prior art.

It is another object of the present invention to provide a microfilm reader which can enjoy a wider range of use.

It is still another object of the present invention to provide a microfilm reader which is operable even when a main power source is unavailable due to failure of power supply or other accident.

It is a further object of the present invention to provide a microfilm reader which normally employs a main lamp unit having a lamp for connection with a main power source and which employs an auxiliary lamp unit having a lamp unit for connection with an auxiliary power source such as dry cells or storage batteries during the failure of power supply or when the main power source is unavailable, the two lamps units being selectively and removably mounted in the housing of the reader.

BRIEF DESCRIPTION OF THE DRAWINGS

Other objects of the present invention will become fully apparent from the following detailed description of specific embodiments taken in conjunction with the accompanying drawings, in which.

DESCRIPTION OF THE PREFERRED EMBODIMENTS

The term "microfilm" used herein includes various forms of microfilm such as rolled microfilm having micro images recorded thereon in juxtaposed relationship, sheets of microfiche film having frames of micro images recorded thereon in matrix form, and the like.

Figure 1:
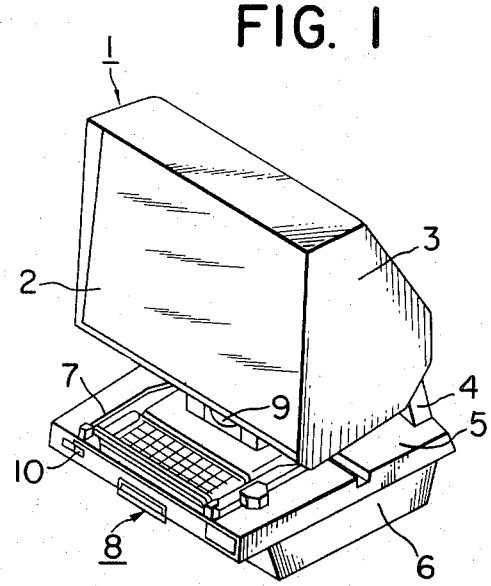
FIG. 1 is a perspective view showing an entire microfilm reader to which the present invention is applied.

Referring to FIG. 1, there is illustrated a microfilm reader of the present invention with a lamp unit for connection with a main power source. The microfilm reader is generally designated by 1 and includes a diverging screen 2, an upper housing 3, an intermediate leg portion 4, a lower housing 6 provided with a top cover 5, a fiche holder 7 having a pair of transparent glass plates for holding a microfiche film therebetween, and a lamp unit 8 for connection with a main power source. The fiche holder 7 is slidably mounted on the upper surface of the top cover 5 of the lower housing 6, and may be moved horizontally into position for selectively projecting upon the diverging screen 2 desired one or more frames of the micro images recorded on the microfiche. Such fiche holder 7 is conventionally used with microfilm readers, and need not be described further. A focusing knob 9 is provided to adjust a projection lens mounted in the lower portion of the upper housing 3. Numeral 10 designates a main switch.

Figure 4:
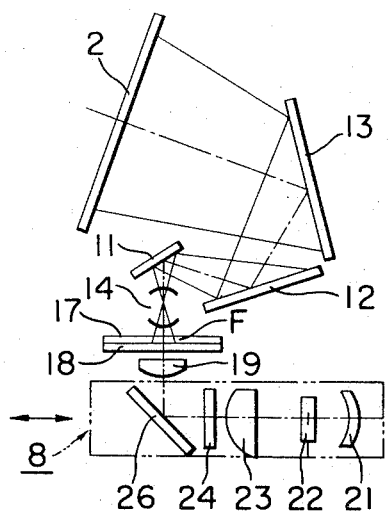
FIG. 4 schematically shows the interior construction of the FIG. 1 reader.

As shown in FIG. 4, the upper housing 3 containes therein three mirrors 11, 12 and 13 disposed in opposed relationship with one another, and a projection lens 14 disposed below the mirror 11. The projection lens 14 is fitted in a pressure casing 16 loosely fitted over a tube 15 for the lens 14, as particularly shown in FIG. 6, and the pressure casing 16 is attached to the lower portion of the upper housing 3 by spring means (not shown).

The fiche holder 7 holds a microfiche F between a pair of transparent glass plates 17 and 18, as shown in FIG. 4.

Figure 6:
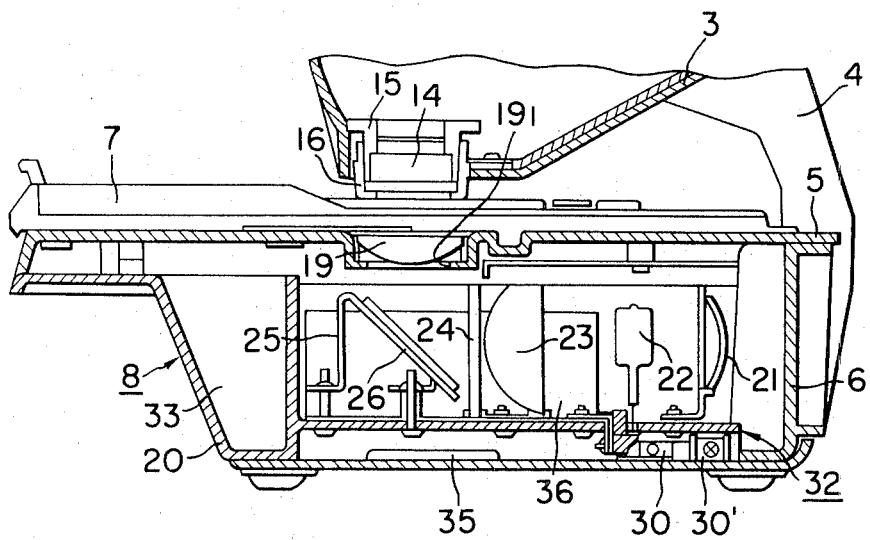
FIG. 6 is a sectional view showing the essential parts of the FIG. 1 reader.

An aperture $19_1$ is formed through the top cover 5 at a portion thereof which is opposed to the lens 14, and a condenser lens 19 is secured covering the aperture $19_1$ (see FIGS. 4 and 6).

Through the front wall of the lower housing 6 is formed an opening through which the lamp unit 8 may be inserted laterally in a drawerlike fashion and mounted within the lower housing 6.

Figure 7:
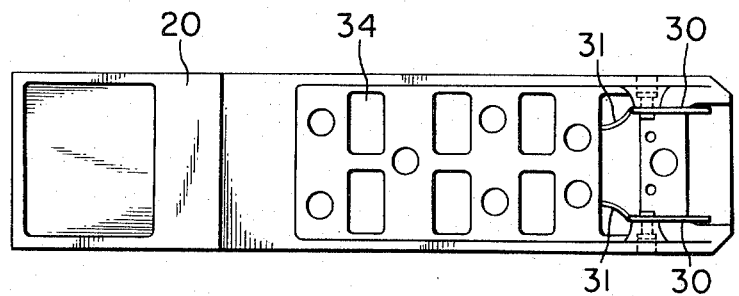
FIG. 7 is a back side view of a lamp unit for connection with a main power source.
Figure 8:
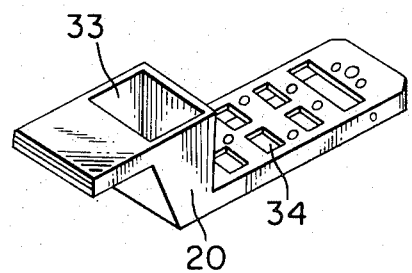
FIG. 8 is a fragmentary perspective view of the lamp unit for connection with a main power source.

As seen in FIG. 6, the main lamp unit 8 comprises a boat-shaped base 20 (FIG. 8) which securely carries thereon an illuminating optical system including a concave mirror 21, a condenser lens 23, an adiabatic filter 24 and a mirror 26 secured to a carrier plate 25, and a lamp 22 for connection with a main power source which is also carried on the base 20. A pair of conductive plug members 30 is secured to the back or lower side of the base 20 by means of screws (see FIG. 7), and connected with the lamp 22 through electrical cords 31.

A pair of snap members 30' is secured to the bottom wall of the lower housing 6 and located to correspond to the plug member 30. The plug members 30' are connected with the main power source by unshown electrical cords. Thus, when the main lamp unit 8 is inserted into the lower housing 6 in a drawer-like fashion, the plug members 30 secured to the base 20 are received into the mating portions 30'' of the snap members 30', thus connecting the lamp 22 with the main power source to form an electrical circuit while the main lamp unit 8 is mounted at a predetermined position within the lower housing 6. At the same time, the front end portion of the base 20 is engaged with a recess 32 formed in the inner wall of the lower housing 6, to ensure the lamp unit 8 to be more reliably mounted in the lower housing 6.

The base 20 is also provided with a small chamber 33 in which spare lamps may be housed to replace the lamp 22 when the latter fails.

A plurality of apertures 34 is formed through the base 20 at the portions thereof where the illuminating optical system and lamp are located (see FIGS. 7 and 8), and these apertures cooperate with a vent hole 35 formed in the bottom wall of the lower housing 6 to circulate the air through the housing 6 so as to prevent temperature rise of this housing which would otherwise result from the lamp 22. An adiabatic plate 36 is also, attached on the side walls of the base 20 to isolate unshown transformer securely mounted in the lower housing from the main lamp unit 8 so as to protect the transformer against temperature rise.

Figure 3:
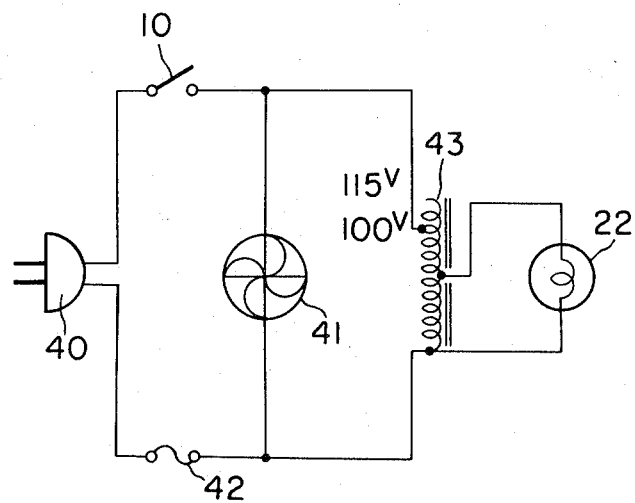
FIG. 3 diagrammatically shows the main power source circuit of the FIG. 1 reader.

The main power source circuit of the reader 1 with the lamp unit 8 mounted therein is shown in FIG. 3. A plug 40 may be inserted into a plug socket of a commercially available power source. A cooling fan motor 41, disposed in the lower housing, is parallel connected with the plug 40 across a temperature fuse 42 and switch 10. The fuse 42 may be fused upon abnormal heating of the circuit to thereby cut off the circuit. The fusing point of the fuse 42 is normally 72° C. A transformer 42 is further parallel-connected and one end of its primary winding can be changed over to 115V or 100V. The lamp 22 may be a halogen lamp of 12V–100W or 24V–150W, for example.

When the main lamp unit 8 is laterally inserted into the lower housing 6 of the reader 1 in a drawer-like fashion, the plug members 30 of the base 20 are received into the snap members 30' so that the lamp unit 8 is mounted at a predetermined position within the lower housing 6 and the lamp 22 is connected with the main power source circuit. When the plug 40 is received in the plug socket of the commercially available power source and then the switch 10 provided in the front face of the reader is closed, the fan motor 41 starts to rotate and the lamp 22 is turned on. The light emitted from the lamp 22 passes through the condenser lens 23, adiabatic filter 24, mirror 26 and condenser lens 19 to illuminate a predetermined recorded frame of the microfiche F sandwiched between the glass plates 17 and 18 of the fiche holder 7. The image recorded on the fiche F is projected upon the screen 2 via the projection lens 14 and mirrors 11, 12, 13. Thus, the reader 1 may be operated in the same manner as ordinary readers once the main lamp unit 8 is mounted therein.

When the reader 1 is used during failure of power supply or at a place having no commercial power source, the main lamp unit 8 may be replaced by a lamp unit for connection with an auxiliary power source which will be described hereinafter.

Figure 5:
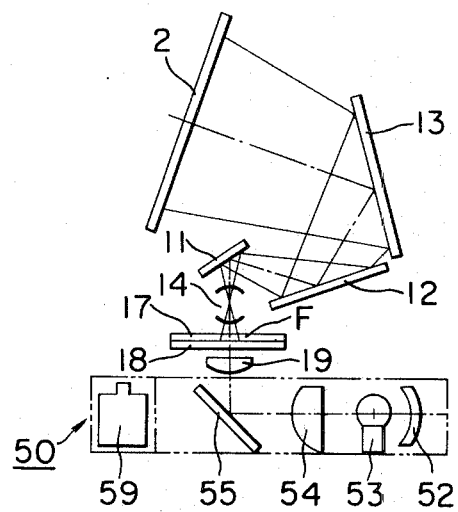
FIG. 5 schematically shows the interior construction of the FIG. 1 reader as a lamp unit for connection with an auxiliary power source is applied thereto.
Figure 9:
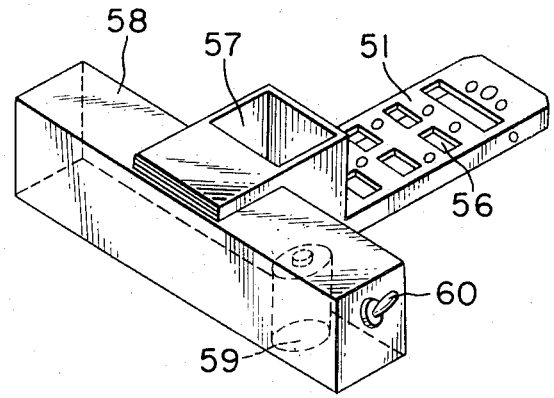
FIG. 9 is a fragmentary perspective view of the lamp unit for connection with an auxiliary power source.

Referring to FIG. 5, a lamp unit for connection with an auxiliary power source is designated by 50 and comprises a lamp base 51, which carries thereon a concave mirror 52, a lamp 53, a condenser lens 54 and a mirror 55, as shown in FIG. 9. The lamp base 51 is configured similarly to the base 20 of the lamp unit 8 and formed with a plurality of apertures 56 for circulation of air therethrough and a small chamber 57 for housing spare lamps.

Figure 2:
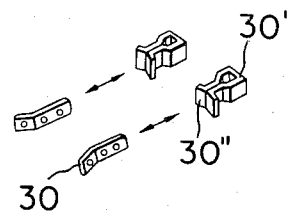
FIG. 2 is a perspective view of plugs and snaps used in the reader of FIG. 1.

Plug members 30 (see FIG. 2) are secured to the back side of the lamp base 51. When the auxiliary lamp unit 50 is inserted into the lower housing 6 of the reader 1 in a drawer-like fashion, the plug members 30 are received in the snap members 30' in the lower housing 6, thus securely mounting the auxiliary lamp unit 50 in the lower housing 6. In this case, the plug members 30 cooperate with the snap members 30' only to secure the mounting of the auxiliary lamp unit 50 in the housing, and the lamp 26 is connected with auxiliary power source and is irrespective of the electric circuit for main power source.

An auxiliary power source container case 58 (FIG. 9) is integrally secured to the rear end portion of the lamp base 51 and this case may contain therein a plurality of alkali dry cells 59, which may be connected with the lamp 53 through a switch 60. The lamp 53 may be a tungsten lamp of 6V–20W. A lamp of such luxes enables the recorded images appearing on the screen 2 to be duly read.

If the main power source fails during the use of the reader 1 with the main lamp unit 8 mounted therein or if the reader 1 is to be operated at a place with no main power source, the main lamp unit 8 may be withdrawn out of the reader 1 and replaced by the auxiliary lamp unit 50.

When the auxiliary lamp unit 50 is inserted into the lower housing 6 of the reader 1, the plug members 30 secured to the lamp base 51 are received in the snap members 30' as described above, and the lamp unit 50 is thus mounted in place within the lower housing 6.

The lamp 53 is connected with the auxiliary power source 59 and not with the main power source circuit.

Therefore, when the auxiliary lamp unit 50 is being mounted in the reader 1 during failure of the main power supply, the fan motor 41 alone will be rotated without the possibility of lamp 53 being damaged even if the main power supply is then restored with the switch 10 remaining closed to operate the main power source circuit.

Figure 10:
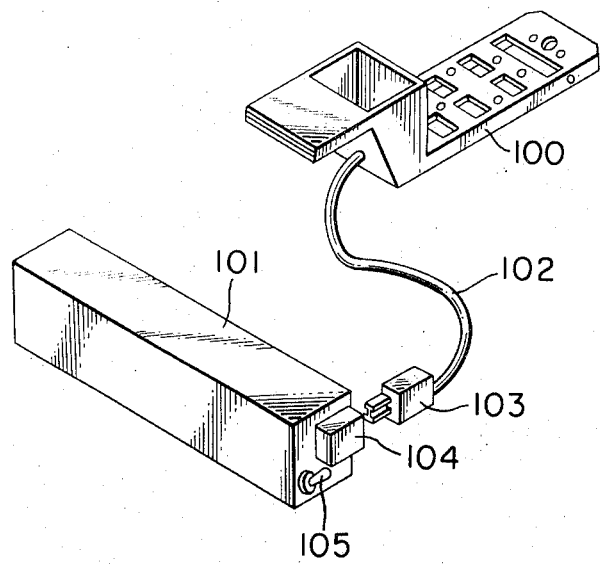
FIG. 10 is a perspective view showing a modficiation of the FIG. 9 lamp unit.

FIG. 10 shows a modification of the embodiment shown in FIG. 9. The lamp base 100 of the auxiliary lamp unit and the auxiliary power source container case 101 are constructed separately from each other. The auxiliary lamp provided on the lamp base 100 may be connected with the auxiliary power source in the case 101 through electrical cord 102, plug 103, plug socket 104 and switch 105. The auxiliary power source may be dry cells or storage batteries.

By making the lamp base of the auxiliary lamp unit and the auxiliary power source container case separate from each other as described above and selecting that lamp base to the same configuration as the base of the main lamp unit, both bases can be shaped in a common mold to a great economical advantage.

Figure 11:
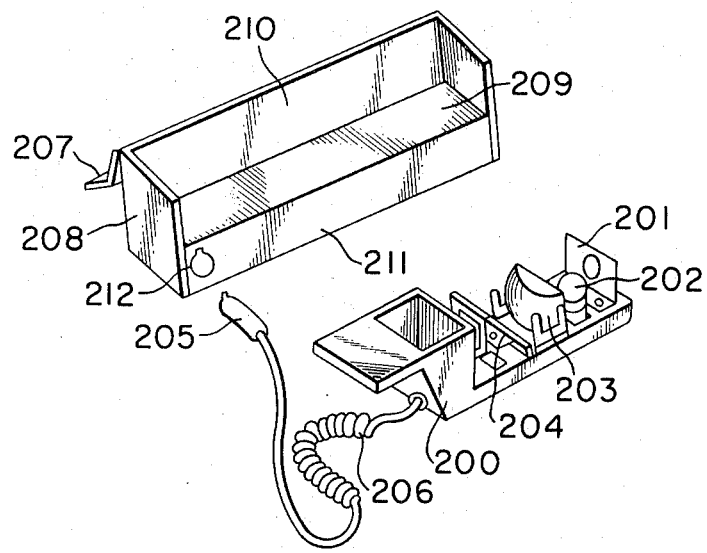
FIG. 11 is a perspective view showing a further modification of the FIG. 9 lamp unit.

FIG. 11 shows another form of the auxiliary lamp unit which is designed so that a lamp base and an auxiliary power source may be housed in a common housing to provide a greater degree of protability. The lamp base 200 carries thereon a concave mirror 201, an auxiliary lamp 202, a condenser lens 203 and mirror 204. The lamp 202 may be connected with a cord 206 having a plug 205 at the free end thereof. A housing 208 having a hinged top cover 207 is divided into an upper housing 210 and a lower housing 211 by an intermediate cover 209 which is free to open and shut. The upper housing 210 houses therein the lamp base 200 and the lower housing 211 houses therein the auxiliary power source. By inserting the plug 205 into a plug socket 212 connected with the auxiliary power source contained in the lower housing 211, the auxiliary lamp 202 may be turned on.

According to the present invention, as has been described above, a main lamp unit for connection with a main power source may normally be used to operate the microfilm reader, and during failure of the main power supply or in the absence of such main power source, the main lamp unit may be replaced by an auxiliary lamp unit for connection with an auxiliary power source to continue the operation of the microfilm reader. Moreover, both lamp units can be inserted into and removed from the reader in a drawer-like fashion, so that the lamp units can be readily and smoothly replaced with each other.

Furthermore, by making the entire reader into a compact structure, the need to select the space for using the reader may be eliminated and a wider range of use will be available for such reader than for the reader of the prior art.

The embodiments described above are only exemplary of the present invention and various changes and modifications thereof may be made without departing from the spirit of the invention as defined in the appended claims.

We claim:

1. A microfilm reader for reading micro images recorded on a microfilm comprising a housing having an opening, a projection screen disposed in said housing, optical means for projecting images on said microfilm toward said screen; a first light source unit having a first base disposed thereon a main lamp, an optical system for directing the light from said main lamp to said microfilm and a plug connected to said main lamp; a second light source unit having a second base disposed thereon an auxiliary lamp connected to an auxiliary electric source, an optical system for directing the light from said auxiliary lamp to said microfilm and a plug not electrically connected to said auxiliary lamp; said first and second bases having said respective plugs at corresponding fixed positions and having the same configuration for permitting them to be selectively and exchangeably fitted into and detached from said opening of said housing in a drawer-like fashion; and a snap member fixedly provided in said housing for holding either of said bases by engaging either of said plugs when either of said light source units are inserted in said opening, said snap member being electrically connected to an AC electrical source.

2. A microfilm reader according to claim 1, wherein said auxiliary power source connected to said auxiliary lamp comprises battery means.

3. A microfilm reader according to claim 2 wherein said case comprises a movable lid and two partitioned chambers in the shape of a rectangle, wherein a first partitioned chamber incorporates therein said battery means and a second partitioned chamber incorporates therein said second base disposed thereon said illuminating optical system and said auxiliary lamp, said second base being taken out of said case by moving said movable lid.

4. A microfilm reader for reading micro images recorded on a microfilm comprising a housing having an opening, a projection screen disposed in front face of said housing, optical means for projecting therethrough images on said screen, illuminating means for illuminating said microfilm and including a main unit having a main light source for connection with a main power source and an auxiliary unit having a base, an illuminating optical system, an auxiliary light source for connection with an auxiliary power source and said base, said case comprising a movable lid and two partitioned chambers in the shape of a rectangle, wherein a first partitioned chamber incorporating therein said auxiliary power source and a second partitioned chamber incorporating therein said base disposed thereon said illuminating optical system and said auxiliary light source, said base being taken out of said case by moving said movable lid, and a film holder disposed between said optical means and said illuminating means for holding said microfilm, said units being selectively and movably mounted within said opening of said housing in a drawer-like fashion.

* * * * *